United States Patent [19]

Honjo et al.

[11] Patent Number: 4,590,523
[45] Date of Patent: May 20, 1986

[54] CONTROL OF AUTO-TRACKING IN TRACKING-ERROR CORRECTING SYSTEM OF VIDEO RECORDING/REPRODUCING APPARATUS

[75] Inventors: Masahiro Honjo; Masao Tomita, both of Neyagawa; Masaaki Kobayashi, Kawanishi, all of Japan

[73] Assignee: Matsushita Electric Industrial Co., Ltd., Kadoma, Japan

[21] Appl. No.: 439,712

[22] Filed: Nov. 4, 1982

[30] Foreign Application Priority Data

Nov. 9, 1981 [JP] Japan ................... 56-179474
Nov. 9, 1981 [JP] Japan ................... 56-179473

[51] Int. Cl.⁴ ............................................. H04N 5/78
[52] U.S. Cl. ................................. 360/10.3; 360/77
[58] Field of Search ..................... 360/10.2–10.3, 360/70, 75, 77

[56] References Cited

U.S. PATENT DOCUMENTS 4,167,763  9/1979  Kubota ........................... 360/77
4,255,771  3/1981  Kubota ........................... 360/77
4,403,260  9/1983  Kawamura et al. ........ 360/10.3 X Primary Examiner—Aristotelis M. Psitos
Attorney, Agent, or Firm—Wenderoth, Lind & Ponack

[57] ABSTRACT

A tracking-error correcting system in a rotary head magnetic recording and reproducing apparatus in which reproducing magnetic heads are mounted on a respective bimorph leaf having piezoelectric elements so as to be movable in the direction of the axis of rotation. The piezoelectric elements are controlled by a control voltage which is produced by adding a signal from an auto-tracking circuit and a signal from a triangular wave generating circuit. In a reproducing mode at a tape speed which is different from a tape speed in recording mode, this system activates the auto-tracking circuit when the control voltage level is within a limited range which is detected by a control voltage detector. Also, this system stops the auto-tracking circuit during a transition period when the reproduction mode changes.

6 Claims, 14 Drawing Figures

CONTROL OF AUTO-TRACKING IN TRACKING-ERROR CORRECTING SYSTEM OF VIDEO RECORDING/REPRODUCING APPARATUS

BACKGROUND OF THE INVENTION

1. Field of the Invention

This invention relates to an auto-tracking apparatus used in rotary head magnetic recording/reproducing apparatus, and more particularly to a tracking-error correcting system for securing the accurate operation of the auto-tracking apparatus.

2. Description of the Prior Art

In a rotary head magnetic recording/reproducing apparatus (VTR, hereafter) it is necessary to detect tracking error between a reproducing head and a recorded track and to move the reproducing head in the direction of the axis of rotation so that the reproducing head is placed at a better tracking position. Such a system is called the 'auto-tracking system'. The piezoelectric element is often used for supporting the magnetic heads. But, generally speaking, the strain of the piezoelectric element does not change linearly for the applied voltage, especially when the voltage is high level, the nonlinearity increases significantly. This means that tracking-error increases in proportion to the increase of the applied voltage. In addition, the sensitivity of the piezoelement degrades gradually as the time passes, so that the nonlinearity increases more significantly. Accordingly, the auto-tracking cannot be completed accurately.

The conventional auto-tracking system samples and holds the envelope of the RF signal from the VTR, and changes (e.g. increases) the control voltage to the piezoelectric element, and then compares the envelope level in the next frame with the held envelope level in the previous frame. As a result, if the next envelope level is higher than the previous envelope level, the control voltage will be further increased, and continue comparing the envelope level with further (next) frame's envelopes. In other words, the control voltage will be changed in the same direction until the envelope level becomes lower than the previous envelope level. When the envelope level is lower than the held envelope level of the previous frame, the direction of the control voltage will be inverted.

In such a conventional auto-tracking system, however, it is necessary to detect the change of the envelope by one step change of the control voltage in each frame. But when the change of the envelope according to the change of sensitivity of the piezoelectric elements exceeds the change of the envelope according to the change of the control voltage, the auto-tracking system cannot avoid to make a mistake. Accordingly, it is necessary that the change of the envelope according to one step change of the control voltage is larger than the change of the envelope according to the change of the piezoelectric element's sensitivity.

Furthermore, if the reproduced envelope is generated abnormally, for example, the envelope level is very low, the auto-tracking system also makes a mistake. Especially, when the reproduction mode is changed, for example, from a forward fast mode to a reverse fast mode, the magnetic tape is not transferred smoothly by the radical change of velocity, so that the reproduced signals applied to a triangular wave circuit are not correct. Thus, the output signal from the triangular wave generator becomes an incorrent signal. Accordingly, the reproduced envelope is improper, so that the output signal from the auto-tracking circuit becomes improper.

Furthermore, even if the output signal from the triangular wave generator recovers to a correct signal, the reproduced envelope is not generated normally at once, because the output signal from the auto-tracking circuit is not correct.

SUMMARY OF THE INVENTION

An object of this invention is to solve the above mentioned problem by moving a reproducing head to attain better tracking position while a control voltage which is applied to a piezoelectric element is within a limited range. In other words, this invention is designed to reduce a bed influence of the change of piezoelement's sensitivity by controlling the auto tracking circuit only when the control voltage is within a limited range.

Another object of this invention is to solve the above mentioned problem by not activating the auto-tracking circuit in a period when the reproduced envelope is improper. A control circuit stops the operation of the auto-tracking circuit, and keeps the previous output signal of the auto-tracking circuit.

These and other objects and features of this invention will become more apparent from the following descriptions taken in connection with the accompanying drawings in which:

DETAILED DESCRIPTION OF THE INVENTION

At first, we will describe in detail how to control the movement of reproducing heads.

Figure 1:
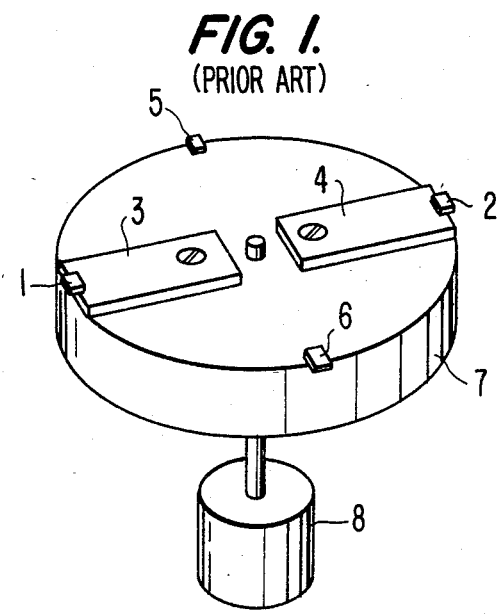
FIG. 1 is a schematic oblique view of a rotary head using piezoelectric elements.

FIG. 1 shows a schematic view of a rotary head using a piezoelectric element. In FIG. 1, elements 1 and 2 are reproducing heads; elements 3 and 4 are bi-morph leaves each having a piezoelectric element; elements 5 and 6 are recording and reproducing heads element 7 is a rotary cylinder, and element 8 is a motor. The movement of the bi-morph leaves 3 and 4 are controlled by a control voltage.

Now, the reproducing speed of the magnetic tape is the same as the recording speed.

Figure 2:
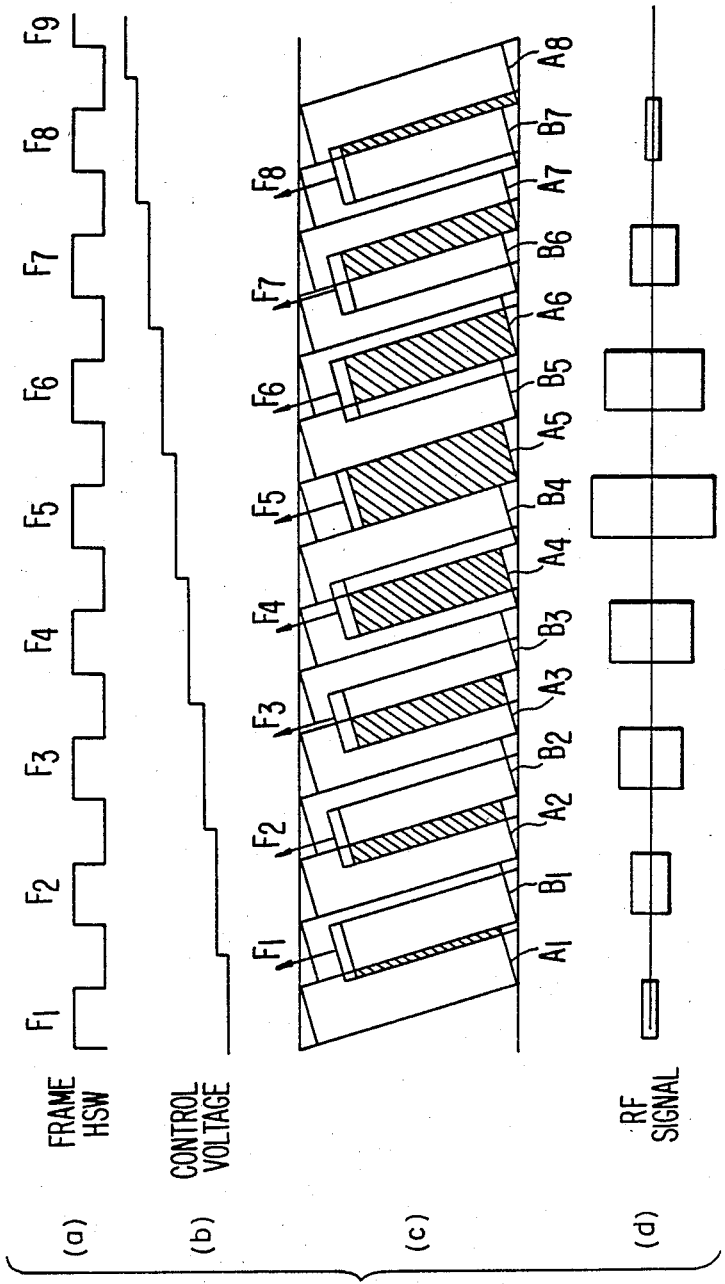
FIGS. 2(a)–(d) are signal diagrams for explaining the relationship between a control voltage and RF signal.

FIG. 2(a) shows a heat switch signal (HSW). When the HSW is at high level, reproducing head 1 is touching the magnetic tape and reproduces signals from the recorded track. In FIG. 2(c), $A_1$, $A_2$, $A_3$, . . . are tracks recorded by recording head with azimuth A, and $B_1$, $B_2$, $B_3$, . . . are tracks recorded by recording head with azimuth B. Reproducing head 1 with azimuth A can reproduce signals from the tracks $A_1$, $A_2$, . . . but can not reproduce signals from the tracks $B_1$, $B_2$ . . . . When the control voltage which increases step by step in each frame is applied to the piezoelectric element as shown in FIG. 2(b), the scanning trace of the reproducing head changes as shown in FIG. 2(c), so that RF signal level changes as shown in FIG. 2(d). In FIG. 2(c), a hatched part shows a reproductive part which has the same azimuth A as reproducing head 1, and $F_1$, $F_2$ . . . are first frame, second frame, . . . .

Next, we will describe how to control the voltage to the piezoelectric element so that RF signal level is kept at a maximum level. This auto-tracking system samples and holds the envelope of the RF signal from the VTR, and changes (e.g. increases) the control voltage to the piezoelectric element, and then compares the envelope level in the next frame with the held envelope level in the previous frame. As a result, if the next envelope level is higher than the previous envelope level, the control voltage will be further increased, and continue comparing the envelope level with further (next) frame's envelopes. In other words, the control voltage will be changed in the same direction until the envelope level becomes lower than the previous envelope level. When the envelope level is lower than the held envelope level of the previous frame, the direction of the control voltage will be inverted.

Figure 3:
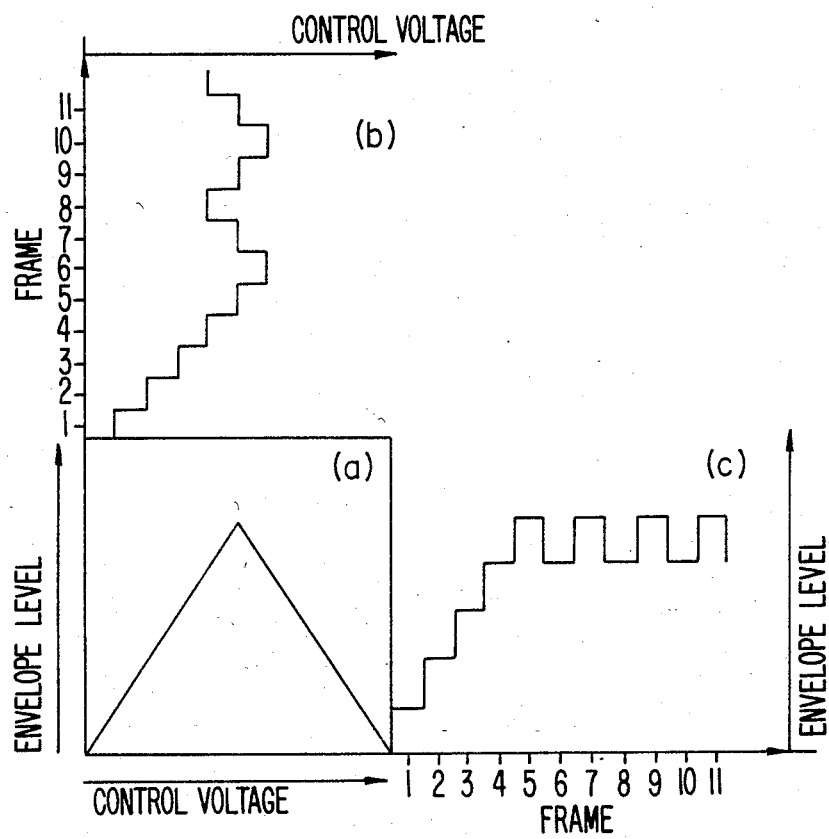
FIGS. 3(a)–(c) are signal level digrams showing the relationship between a control voltage and an envelope level.

FIGS. 3(a)-(c) show a schematic diagram of the relationship between the control voltage and the envelope level. FIG. 3(b) shows the change of the control voltage in each field and FIG. 3(c) shows the change of the reproduced envelope level. As shown in FIGS. 3(a)-(c), until the 5th frame the envelope level increases in the same direction and the control voltage also increases. However, at 6th frame, the envelope level begins to decrease, that is, the direction of the control voltage is inverted to decreasing. Also, the envelope level at 7th frame increases again. The envelope level of 8th frame decreases. As the above, the direction of the control voltage is inverted in turn.

In this way, the auto-tracking system controls the control voltage so as to keep a balance in the neighborhood of any point to obtain the maximum envelope level.

Figure 4:
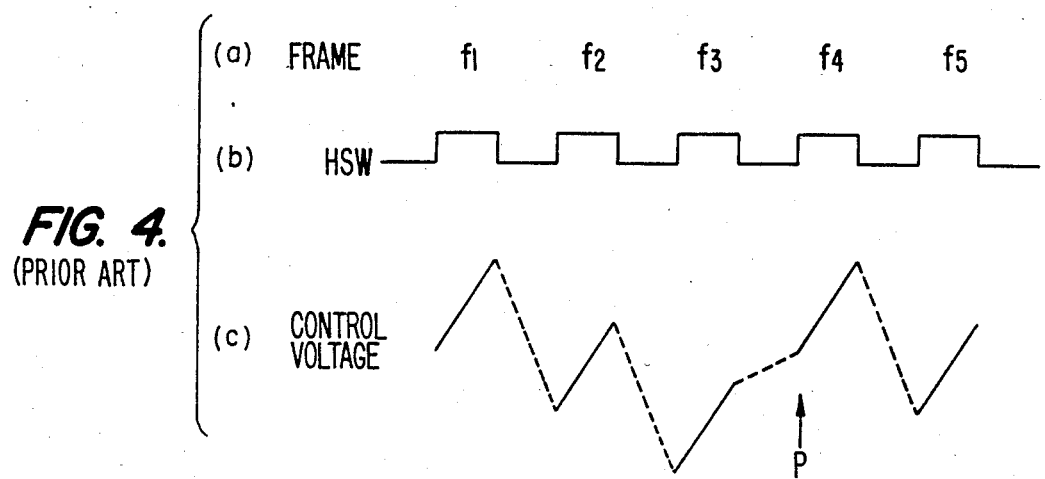
FIGS. 4(a)–(c) are signal diagrams showing the relationship between a HSW and control voltage in slow motion reproduction.

FIGS. 4(a)-(c) show a control voltage in slow motion reproduction with respect to the frmes and HSW. $f_1$, $f_2$, $f_3$ show the frames in which a reproducing head scans the same track and a control voltage shifts down as the magnetic tape transfers. When the reproducing head moves to the next frame $f_4$, the control voltage changes by a large amount (point $P_1$). Here the broken line means a period when the reproducing head does not touch the magnetic tape.

Providing that a recording track pitch is $l_{\mu m}$, the change of one step control voltage is $C_{\mu m}$, and the change of piezoelectric element's sensitivity is S%, the following relationship must be realized so as to avoid an error operation of the autotracking system.

$$C > 1/100 \cdot S \cdot l$$

For example, if $l = 120_{\mu m}$, $C = 3_{\mu m}$, then $S < 2.5\%$. This means, if the change of piezoelement's sensitivity is larger than 2.5%, the auto-tracking system will make a mistake.

The deviation of the piezoelement's sensitivity between frames depends on the difference of the applied voltage between the frames. Accordingly, the auto-tracking circuit is controlled to operate only when a certain constant voltage is applied, the influence of the deviation of the piezoelement's sensitivity can be eliminated. Therefore, according to this invention, the auto-tracking circuit is activated only when the level of the control voltage is within a small range ($\alpha\%$), whereby the influence of the change of the piezoelement's sensitivity can be significantly reduced. In other words, if the tracking operation is to be performed when the control voltage level is within the range of $\alpha\%$ of the full applied voltage, the following relationship may be realized:

$$C > 1/100 \cdot 1/100 \cdot S \cdot l \cdot \alpha$$

For example if $l = 120_{\mu m}$, $C = 3_{\mu m}$, $S = 10\%$, then $\alpha < 25$. This means the error operation can be avoided by activating the auto-tracking circuit only within the range of 25% of the full control voltage when 10% of sensitivity change occurs. This is shown in FIGS. 5(a), (b).

Figure 5A:
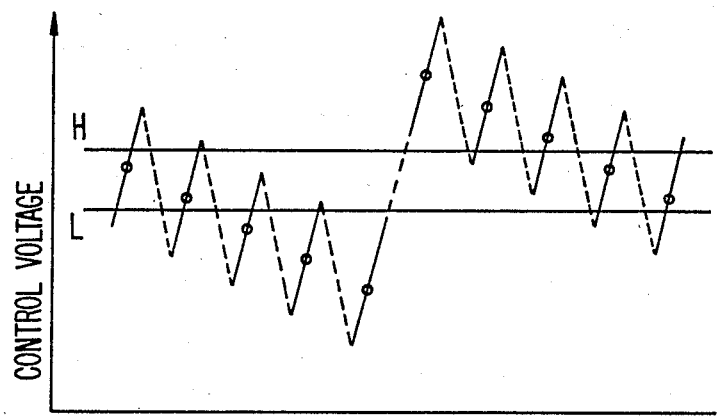
FIGS. 5(a), (b) are signal diagrams showing the relationship between a control voltage, a limited range, and an output from a auto-tracking circuit according to this invention.
Figure 5B:
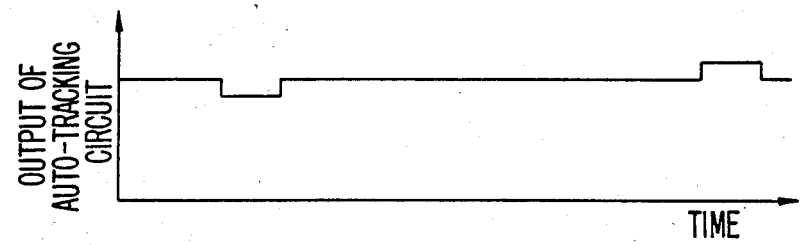

FIG. 5(a) shows a control voltage, H and L shows the upper and lower limits, between which the auto-tracking circuit can operate. FIG. 5(b) shows an output from the auto-tracking circuit. The auto-tracking circuit begins operating when the center of a field (small circle in FIG. 5(a)) is in $\alpha\%$ of the control voltage.

Figure 6:
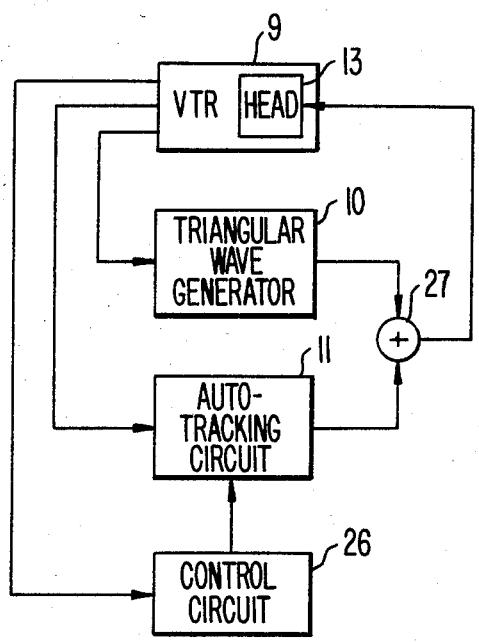
FIGS. 6 and 7 are schematic block diagrams of embodiments of a tracking-error correcting system according to this invention.
Figure 7:
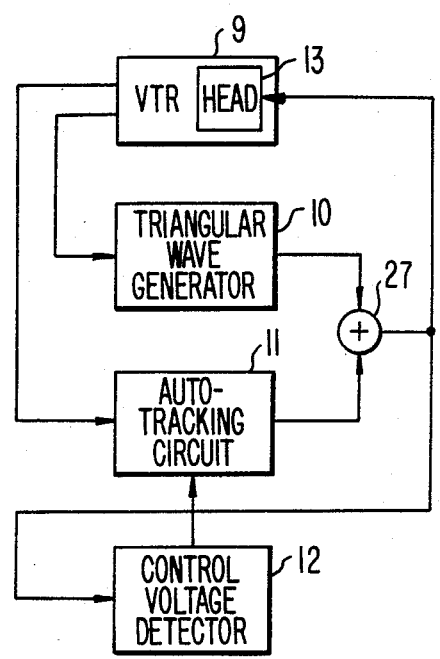
Figure 10:
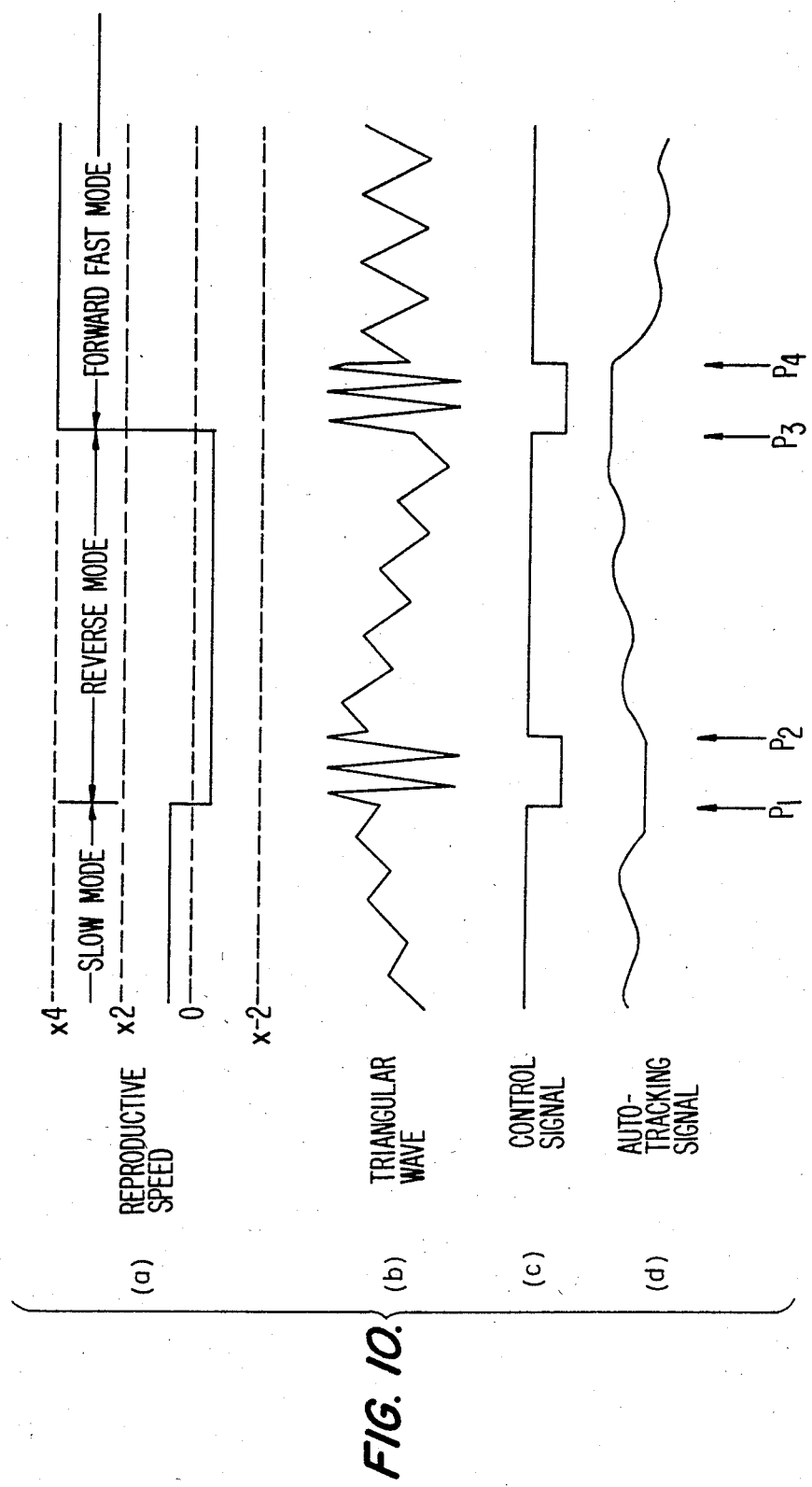
FIGS. 10(a)–(d) are signal diagrams showing an example of a timing chart according to this invention.

FIG. 6 shows a schematic block diagram of an embodiment of a tracking-error system according to the invention. FIG. 7 shows a schematic block diagram of another embodiment of the same. In FIGS. 6 and 7, a triangular wave generator 10 corrects the difference of slant between the trace of the reproducing head and the recorded track in an abnormal reproducing mode in which the tape speed is different from the recording tape speed. The signal from the triangular wave generator 10 and the signal from the auto-tracking circuit 11 are added by an adder 27, and the added signal is applied to the moving head 13 in VTR 9. The above described arrangement of the VTR 9, triangular wave generator 10, auto-tracking circuit 11 and adder 27 is well-known. The embodiment of FIG. 6 will be described later in connection with FIG. 10. Referring to FIG. 7, a control voltage detector 12 controls to activate the auto-tracking circuit 11 when the control voltage is within a limited range, or to stop the auto-tracking circuit 11 when the control voltage is beyond the limited range.

Figure 8A:
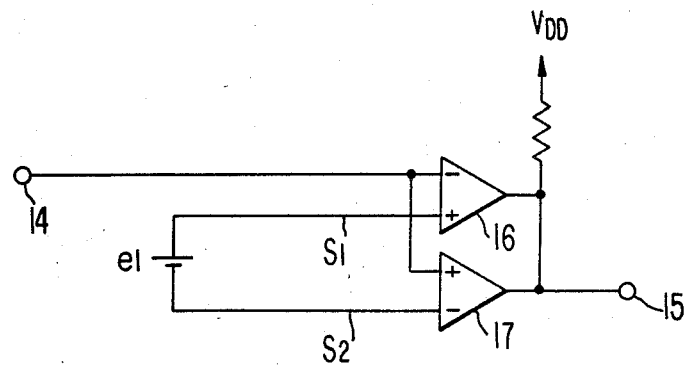
FIGS. 8(a), (b) are schematic circuit diagrams of embodiments of control voltage detectors according to this invention.

FIG. 8(a) shows a circuit diagram of the control voltage detector, which comprises comparators 16, 17, standard voltages $S_1$, $S_2$, and a standard voltage width $e_1$. It is desirable that the control voltage detector generates a signal when the control voltage is not so high by considering the characteristic of the piezoelements. So, standard voltages $S_1$, $S_2$ are set up near 0. If a signal of an input terminal 14 is between the level of $S_1$ and $S_2$, a signal of an output terminal 15 becomes high level.

Figure 8B:
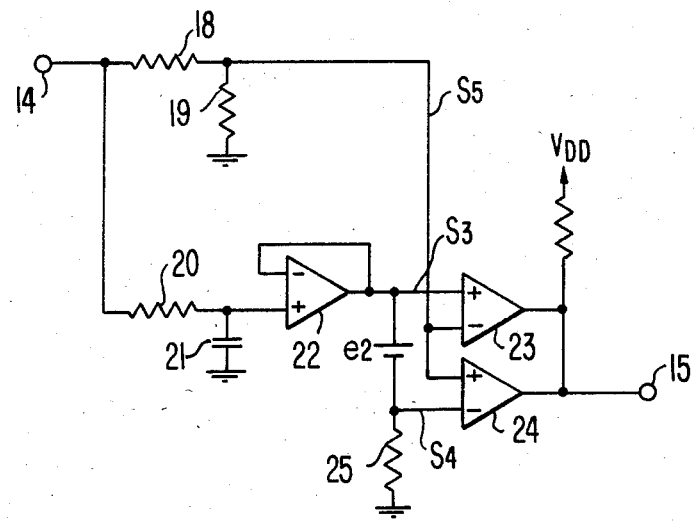
Figure 9A:
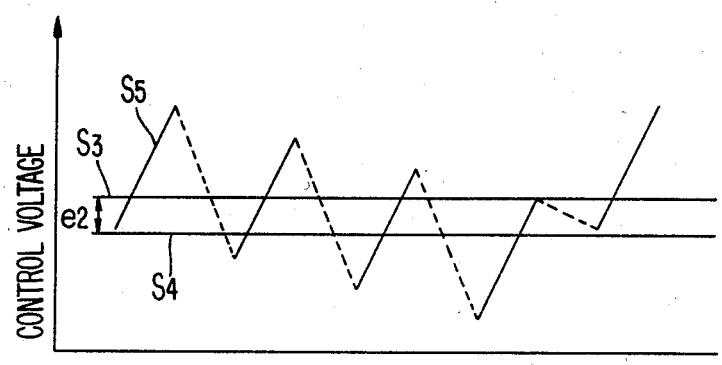
FIGS. 9(a), (b) are signal diagrams showing an example of a control voltage and an output of control voltage detector according to this invention.
Figure 9B:
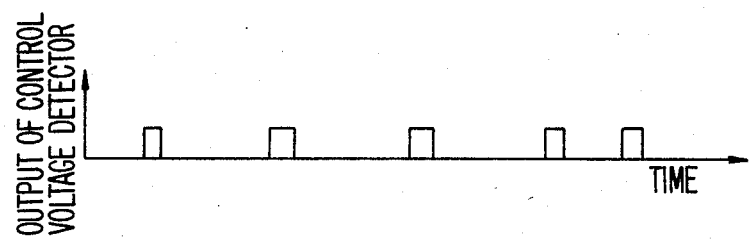

FIG. 8(b) is another example of the control voltage detector, which comprises resistors 18, 19, 20, 25 a capacitor 21, a voltage follower 22, comparators 23, 24 and a standard voltage width $e_2$. Resistor 20 and capacitor 21 constructs a low-pass filter (LPF). A control voltage signal from input terminal 14 passes the LPF 20, 21, and is applied to the voltage follower 22. The output signal of the voltage follower 22 is applied to comparators 23, 24, which compare the signal $S_3$ and $S_4$ with $S_5$, respectively. The signal $S_3$ is an average voltage of the control voltage and the signal $S_4$ is an voltage which is lower by $e_2$ than the signal $S_3$. When the signal level of $S_5$ is between $S_3$ and $S_4$, a signal of output terminal 15 becomes high level. When the signal is high level, the auto-tracking circuit can operate. FIGS. 9(a), (b) show this example. Here resistors 18, 19 are only for dividing the input signal, so that they may be removed.

Now the embodiment shown in FIG. 6 will be described with reference to FIG. 6 and FIGS. 10(a)-(d). FIGS. 10(a)-(d) illustrate an operation example of an abnormal reproduction mode, in which (a) shows the reproducing speed, (b) a signal from the triangular wave generator 10, (c) a signal from the control circuit 26, and (d) a signal from the auto-tracking circuit 11. The signal (b) from the triangular wave generator 10 becomes improper when the reproduction mode, or the reproducing speed (a), changes (the period $P_1-P_2$ or $P_3-P_4$). The change of the reproduction mode (the timing $P_1$ or $P_3$) can be known by a mode change signal which is, as well-known, produced in the VTR9. The control circuit 26 is responsive to this mode change signal to produce the control signal (c) which is a pulse of duration $P_1-P_2$ or $P_3-P_4$. Thus, in this embodiment, the control circuit may comprise a monostable multivibrator. The auto-tracking circuit 11 stops its auto-tracking control operation when it receives the control signal from the control circuit 26, and holds the auto-tracking signal level at the time of the leading edge of the control signal ($P_1$ or $P_3$) during the duration of the control signal ($P_1-P_2$ or $P_3-P_4$). When the control signal disappears ($P_2$ or $P_4$), the auto-tracking circuit 11 starts its auto-tracking control operation again. The duration $P_1-P_2$ or $P_3-P_4$ of the control signal is selected so as to last for a period during which the triangular wave generator 10 would recover its proper operation.

Figure 11:
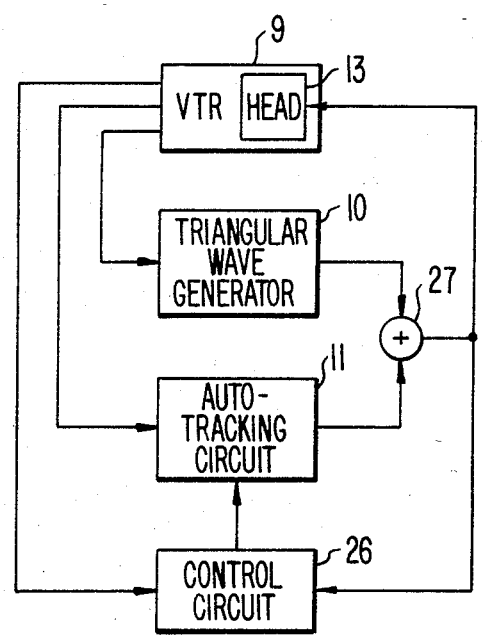
FIG. 11 is a schematic block diagram of another embodiment of a tracking-error correcting system according to this invention.

FIG. 11 shows an example of a schematic block diagram of a further embodiment of a tracking-error system according to this invention. This embodiment is a combination of the above-described embodiments of FIGS. 6 and 7. That is, the control circuit produces the control signal for stopping the operation of the auto-tracking circuit 11 not only when the control voltage level becomes out of the limited range but also when the reproducing mode is changed.

In this way, the tracking-error correcting system operates an auto-tracking circuit when the control voltage level is within a limited range detected by a control voltage detector, and stops the auto-tracking circuit in a period when reproduction mode changes, whereby a stable auto-tracking operation can be performed.

What is claimed is:

1. A tracking-error correcting system in video recording/reproducing apparatus, comprising:
    a head moving means for moving a reproducing head;
    an auto-tracking means for generating a control signal for controlling said head moving means so that said reproducing head attains better tracking;
    a triangular wave generating means for generating a triangular wave signal for correcting a difference of slant between a trace of said reproducing head and a recorded track;
    an adder means for adding said control signal and said triangular wave signal and for supplying an added signal output to said head moving means, said added signal being the sum of said control signal and said triangular wave signal; and
    a control voltage detecting means for detecting the level of said added signal and for allowing said auto-tracking means to operate only when said level of said added signal is within a predetermined range.

2. A tracking-error correcting system according to claim 1, wherein said control voltage detecting means comprises a low-pass filter coupled to said adding means for producing an average level of said added signal, and two comparators which have their outputs connected together for comparing said added signal with said average level of said added signal so as to thereby produce a signal for operating said auto-tracking means.

3. A tracking-error correcting system according to claim 1, wherein said control voltage detecting means comprises a standard voltage source for producing two standard voltage levels, and two comparators which have their outputs connected together for comparing said added signal with said two standard voltage levels so as to thereby produce a signal for operating said auto-tracking means.

4. A tracking-error correcting system in video recording/reproducing apparatus, comprising:
    a head moving means for moving a reproducing head;
    an auto-tracking means for generating a control signal for controlling said head moving means so that said reproducing head attains better tracking;
    a triangular wave generating means for generating a triangular wave signal for correcting a difference of slant between a trace of said reproducing head and a recorded track;
    an adder means for adding said control signal and said triangular wave signal and for supplying an added signal output to said head moving means, said added signal being the sum of said control signal and said triangular wave signal; and
    a control means for detecting the level of said added signal and allowing said auto-tracking means to operate only when said level of said added signal is within a predetermined range, said control means being also responsive to a mode change signal from said apparatus indicating a change of reproducing mode of said apparatus for disabling the operation of said auto-tracking means for a predetermined period from an occurrence of said mode change signal.

5. A tracking-error correcting system according to claim 4, wherein said control means includes a low-pass filter coupled to said adding means for producing an average level of said added signal, and two comparators which have their outputs connected together for comparing said added signal with said average level of said added signal so as to thereby produce a signal for operating said auto-tracking means.

6. A tracking-error correcting system according to claim 4, wherein said control means includes a standard voltage source for producing two standard voltage levels, and two comparators which have their outputs connected together for comparing said added signal with said two standard voltage levels so as to thereby produce a signal for operating said auto-tracking means.

* * * * *